US005723532A

United States Patent [19]

Izumitani et al.

[11] Patent Number: 5,723,532
[45] Date of Patent: Mar. 3, 1998

[54] LONG-FIBER-REINFORCED HIGH-IMPACT POLYSTYRENE RESIN STRUCTURE AND MOLDING THEREOF

[75] Inventors: Tatsuo Izumitani, Nagano; Haruji Murakami, Shizuoka, both of Japan

[73] Assignee: Daicel Chemical Industries, Ltd., Osaka, Japan

[21] Appl. No.: 579,262

[22] Filed: Dec. 27, 1995

[30] Foreign Application Priority Data

Dec. 28, 1994 [JP] Japan ................... 6-328531

[51] Int. Cl.⁶ ................... C08K 7/14
[52] U.S. Cl. ................... 524/525; 524/494; 524/496
[58] Field of Search ................... 524/494, 525, 524/496

[56] References Cited

U.S. PATENT DOCUMENTS 3,608,033 9/1971 Hall .
4,169,186 9/1979 Tazaki et al. ................... 428/406

FOREIGN PATENT DOCUMENTS 0058031 8/1982 European Pat. Off. .
0352875 1/1990 European Pat. Off. .

OTHER PUBLICATIONS

Arnold, 1245 Kunstsfof en Rubber, vol. 37, No. 4, pp. 21–24 (Apr. 1984).

Primary Examiner—Melvyn I. Marquis
Attorney, Agent, or Firm—Birch, Stewart, Kolasch & Birch, LLP

[57] ABSTRACT

To provide a resin material greatly improved in rigidity and strength while maintaining or further improving the impact resistance characteristic of a high-impact polystyrene.

A long-fiber-reinforced high-impact polystyrene resin structure of at least 3 mm in length is formed by compounding (A) a high-impact polystyrene resin with (B) 8 to 80 wt. % (based on the whole composition) of a fibrous reinforcement blended therewith, the fibrous reinforcement (B) being substantially the same in length as the structure and arrayed substantially in parallel in the lengthwise direction of the structure.

6 Claims, No Drawings

LONG-FIBER-REINFORCED HIGH-IMPACT POLYSTYRENE RESIN STRUCTURE AND MOLDING THEREOF

FIELD OF THE INVENTION

The present invention relates to a long-fiber-reinforced high-impact polystyrene (HIPS) resin structure composed of a high-impact polystyrene resin as the matrix resin reinforced with long fibers to thereby effect not only substantial improvements in the rigidity and strength of the resin but also a striking improvement in the impact resistance of the resin. Also, the present invention relates to a molding thereof.

DESCRIPTION OF RELATED ART

The high-impact polystyrene (HIPS) resin is a matrix of polystyrene resin having a rubber component microdispersed therein for overcoming the brittleness which is a drawback of the polystyrene resin to thereby improve the impact resistance. The high-impact polystyrene resin is generally produced by conducting free-radical polymerization of a styrene monomer solution having a rubber component dissolved therein.

This high-impact polystyrene (HIPS) resin is excellent in impact resistance, has appropriate mechanical strength, and is relatively inexpensive, so that it is often employed in a wide spectrum of application fields such as a cabinet for electric appliance, a food container, a toy, and sundries. Now, a demand for further improvement of the rigidity, mechanical strength and other properties of the high-impact polystyrene resin is increasing in accordance with the expansion of these application fields.

It has been a general practice to compound a fibrous reinforcement such as glass fibers with a resin for improving the rigidity, strength, etc., of the resin. A resin reinforced with short fibers is produced by mixing a resin with short fibers such as a chopped strand and executing melt kneading and extrusion of the mixture with the use of an extruder.

However, it is known that, with respect to the high-impact polystyrene, reinforcement with short glass fibers or the like for improving the rigidity, strength, etc., thereof leads to the improvements in the rigidity and strength thereof but the reinforcement causes the impact resistance which is the inherent characteristic of the high-impact polystyrene to gravely lower. The extent of this impact resistance lowering is marked as compared with those of other general resins. It has been difficult to enhance the rigidity and strength of the material while maintaining its impact resistance.

The task of the present invention is to provide a resin material greatly improved in rigidity and strength while maintaining or further improving the impact resistance characteristic of a high-impact polystyrene.

SUMMARY OF THE INVENTION

The inventors have made intensive studies in order to attain the above task. As a result, it has been found that the reinforcement of the high-impact polystyrene resin with long fibers brings about a complex action between the long fibers and the rubber component contained in the high-impact polystyrene resin, so that a reinforcing effect is realized which cannot be anticipated by the results of the conventional reinforcement with short fibers. The present invention has been made on the basis of this finding.

The instant invention resides in a long-fiber-reinforced high-impact polystyrene resin structure of at least 3 mm in length, which is formed by compounding:

(A) a high-impact polystyrene resin with (B) 5 to 80 wt.% (based on the whole composition) of a fibrous reinforcement, and wherein said fibrous reinforcement (B) is substantially the same in length as the structure and is arrayed substantially in parallel in the lengthwise direction of the structure.

In other words, the invention is directed to a cylindrical article having at least 3 mm. composed by a composite comprising (A) and 5 to 80 percent by weight, based on the composite, of (B) one or plural yarns of a reinforcing fiber having substantially the same length as the article, oriented in parallel to one another and to the longitudinal direction of the article.

It is preferable that the rubber component constituting the disperse phase of said high-impact polystyrene resin (A) is one having a number-average particle diameter of 1 to 50 μm.

It is preferable that said high-impact polystyrene resin (A) is one containing 1 to 50 vol. % of the rubber component constituting the disperse phase thereof.

It is preferable that said high-impact polystyrene resin (A) is one containing 5 to 30 vol. % of the rubber component constituting the disperse phase thereof.

It is preferable that the structure is in the form of a pellet of 3 to 100 mm in length.

It is preferable that the molding is produced by molding a long-fiber-reinforced high-impact polystyrene resin structure and said fibrous reinforcement (B) is dispersed with the weight-average fiber length thereof being at least 1 mm.

The present invention will now be described in detail.

The high-impact polystyrene resin (A) for use in the present invention is a matrix of a polystyrene resin having a rubber component microdispersed therein. It is generally produced by dissolving a rubber component in a styrene monomer and performing free-radical polymerization of the resultant solution according to, for example, the bulk or bulk-suspension polymerization technique. Polybutadiene, polyisoprene, styrene/butadiene and hydrogenated styrene/butadiene rubbers and the like are generally used as the rubber component. However, the rubber component is not limited thereto, and any type of rubber can be used as long as the glass transition temperature thereof is not higher than room temperature and it exhibits rubber viscoelasticity. The content of the above rubber component in the high-impact polystyrene resin (A) generally ranges from 1 to 50 vol. % and preferably from 3 to 30 vol. %. The rubber component has a number-average particle diameter generally ranging from 0.5 to 100 μm and preferably from 1 to 50 μm. When use is made of the high-impact polystyrene resin (A) containing the above rubber component of a preferred particle diameter in a preferred content, the synergistic effect, which will be described later, exerted in combination with the long-fiber reinforcement is marked, so that a resin material having well-balanced impact resistance, rigidity, strength, etc., can be obtained.

The above particle diameter of the rubber component is measured by preparing an ultrathin section of the molding of high-impact polystyrene resin by means of an ultramicrotome, staining the section with osmic acid, and observing the stained section by means of a transmission electron microscope. Stained parts of the photographic image thus obtained represent rubber particles. Generally, the number-average particle diameter is determined by measuring the respective diameters of 500 to 1000 rubber particles and dividing the sum of particle diameter measurements by the number of measured rubber particles.

The type of fibrous reinforcement (B) for use ifs the present invention is not particularly limited and, for example, any of glass, carbon, metal and high melting point (high softening point) resin fibers can be used. In the present invention, the reinforcement selected from among the above fibers is loaded in the structure in an amount of 5 to 80 wt. % (based on the whole composition). This reinforcement is substantially the same in length as the resultant reinforced resin structure and compounded in a mode arrayed substantially in parallel in the lengthwise direction of the structure. When the loading of the fibrous reinforcement (B) is less than 5 wt. %, the reinforcing effect thereof is low. On the other hand, when it exceeds 80 wt. %, not only the workability or processability is gravely poor in the step of preparation of the composite, article or structure and molding of the structure, but also any further strength improvement by an increase of the fiber amount can no longer be anticipated. It is preferred that the fiber loading range from 10 to 60 wt. % and especially from 20 to 50 wt. % from the viewpoint of the balance between the reinforcing effect and the workability or processability.

Anyhow it is essential that the resin has got wet to the fiber and the composite will flow well in the step of molding such as injection. It is added that the composite of the invention is sufficient in view of workability and processability.

In the present invention, although the process for producing the fiber-reinforced structure consisting of the above components is not particularly limited, pultrusion processes are especially preferred.

The pultrusion processes fundamentally carry out resin impregnation while drawing continuous fibers. Known pultrusion processes include one in which fibers are passed through an impregnation bath containing a resin emulsion, suspension, solution or melt to thereby effect resin impregnation, another one in which either a powdery resin is blown on fibers or fibers are passed through a vessel containing a powdery resin to thereby attach the powdery resin to the fibers, followed by melting of the resin to thereby effect resin impregnation, and still another one in which a resin is fed toward a cross head die from an extruder or the like while passing fibers through the die to thereby effect resin impregnation. Any of these conventional processes can be employed.

The form of the obtained long-fiber-reinforced resin structure of the present invention is not particularly limited. It can be endowed with the form of a rod, a tape, a sheet and various modified cross-section continuous-lengths, for example, by changing the configuration of the molding die. Generally, the long-fiber-reinforced resin structure is cut into appropriate lengths before forming or use. Especially, it is preferred that the long-fiber-reinforced resin be drawn into a strand and the strand cut into pellets each of 3 to 100 mm in length. Various conventional molding techniques can be employed to form the resultant long-fiber-reinforced resin structure into a desired molded article.

In the present invention, it is preferred that the fibrous reinforcement (B) hold a weight-average fiber length of at least 1 mm in the molded article obtained by molding the above long-fiber-reinforced resin structure. This enables the molded article to maintain high impact resistance, rigidity and strength. The holding of the above fiber length in the molded article is especially important when use is made of a pelletized long-fiber-reinforced resin structure and it is molded by injection molding in which fiber rupture is likely to occur because of shearing force.

Another or a plurality of other thermoplastic resins can be incorporated in the long-fiber-reinforced resin structure or molding thereof according to the present invention within the range of amount not seriously detrimental to the object and effect thereof. For example, another polystyrene resin can be added or a styrene-butadiene block copolymer, a glycidyl-methacrylate-modified polystyrene, a methyl-methacrylate-modified polystyrene or the like can be added as an additive for modifying the high-impact polystyrene resin. Further, any of the conventional substances generally added to thermoplastic resins, for example, a stabilizer such as an antioxidant, a heat stabilizer or an ultraviolet absorber, an antistatic agent, a flame retarder, a flame retardant auxiliary, a colorant such as a dye or a pigment, a lubricant, a slip additive, a plasticizer, a mold releasing agent, a crystallization promoter and a nucleating agent can be compounded in the long-fiber-reinforced high-impact polystyrene resin structure for imparting desired properties in accordance with the object. Still further, any of various conventional short fibers and platy or particulate inorganic compounds such as glass flake, mica, glass bead, talc, clay, alumina, carbon black and wollastonite can be added thereto in an appropriate amount.

EXAMPLE

The present invention will now be described in greater detail with reference to the following Examples, which in no way limit the scope of the invention.

Examples 1 to 3 and Comparative Examples 1 to 3

Use was made of a high-impact polystyrene (HIPS) resin having a melt flow rate of 14 g/10 min (at 200° C. under a load of 5 kgf), a rubber component content of 8% by weight and a number-average rubber particle diameter of 2.0 µm as measured by the osmic acid staining method.

Impregnation with a melt of the above HIPS resin was carried out at a resin temperature of 240° C. while opening and pulling a roving of glass fibers (13 µm in diameter). Then, a strand was pulled through a molding die and cut to thereby obtain a long-fiber-reinforced HIPS resin structure of the composition specified in Table 1 which had the form of a pellet of 9 mm in length (Examples 1 to 3).

The obtained pellets were injection molded into test pieces, with which the tensile strength, flexural strength, flexural modulus, Izod impact strength and deflection temperature under a load of 18.6 kgf/cm$^2$ (heat distortion temperature) were measured in accordance with the ASTM measuring methods. The resin component of each molded test piece was burned in an electric furnace to find the length of the fiber in the molding. After the burning, the respective lengths of remaining glass fibers were measured and a weight-average fiber length was calculated therefrom.

Separately, for comparison, the HIPS resin was blended with chopped glass fibers (13 µm in diameter) and melt kneaded by means of an extruder according to the customary method, thereby obtaining short-fiber-reinforced HIPS resin pellets (Comparative Examples 1 and 2). The HIPS resin not reinforced with glass fibers (Comparative Example 3) was also molded in the same manner. The moldings were evaluated. In the production of short-fiber-reinforced HIPS resin pellets by means of an extruder, an increase of the amount of the glass fibers to 50 wt. % rendered the extrusion extremely difficult, thus failing in the preparation of a normal specimen.

The obtained measurement results are given in Table 1.

Examples 4 to 6 and Comparative Examples 4 to 6

Long-fiber-reinforced HIPS resin structure pellets and short-fiber-reinforced HIPS resin structure pellets were prepared, molded and evaluated in the same manner as in Examples 1 to 3 and Comparative Examples 1 to 3 except that use was made of a high-impact polystyrene (HIPS) resin having a melt flow rate of 3.5 g/10 min (at 200° C. under a load of 5 kgf), a rubber component content of 8% by weight, and a number-average rubber particle diameter of 0.8

The obtained measurement results are given in Table 2.

Comparative Examples 7 to 11

For comparison, long-fiber-reinforced PS resin and short-fiber-reinforced PS resin pellets were prepared, molded and evaluated in the same manner as in Examples 1 to 3 and Comparative Examples 1 to 3 except that use was made of a polystyrene (PS) resin not containing any rubber component. The melt flow rate of the employed PS resin was 10 g/10 min (at 200° C. under a load of 5 kgf).

The obtained measurement results are given in Table 3.

TABLE 1

| | Compsn. | | | Tensile strength (kgf/cm$^2$) | Flexural strength (kgf/cm$^2$) | Flexural modulus (kgf/cm$^2$) | Impact strength (kg · cm/cm) | Heat distortion temp. (°C.) | Av. fiber length (mm) |
|---|---|---|---|---|---|---|---|---|---|
| | resin | glass cont. (wt. %) | | | | | | | |
| Ex. 1 | HIPS | 10 | reinforced with long fiber | 370 | 610 | 34500 | 20 | 87 | 3.0 |
| Ex. 2 | HIPS | 30 | reinforced with long fiber | 730 | 980 | 68000 | 29 | 91 | 3.2 |
| Ex. 3 | HIPS | 50 | reinforced with long fiber | 750 | 710 | 79400 | 15 | 90 | 3.0 |
| Comp. Ex. 1 | HIPS | 10 | reinforced with short fiber | 290 | 400 | 28500 | 6 | 82 | 0.2 |
| Comp. Ex. 2 | HIPS | 30 | reinforced with short fiber | 560 | 650 | 60800 | 4 | 86 | 0.2 |
| Comp. Ex. 3 | HIPS | 0 | not reinforced | 210 | 320 | 19000 | 9 | 73 | — |

TABLE 2

| | Compsn. | | | Tensile strength (kgf/cm$^2$) | Flexural strength (kgf/cm$^2$) | Flexural modulus (kgf/cm$^2$) | Impact strength (kg · cm/cm) | Heat distortion temp. (°C.) | Av. fiber length (mm) |
|---|---|---|---|---|---|---|---|---|---|
| | resin | glass cont. (wt. %) | | | | | | | |
| Ex. 4 | HIPS | 10 | reinforced with long fiber | 410 | 600 | 39500 | 12 | 88 | 2.9 |
| Ex. 5 | HIPS | 30 | reinforced with long fiber | 720 | 750 | 72300 | 15 | 92 | 3.0 |
| Ex. 6 | HIPS | 50 | reinforced with long fiber | 760 | 780 | 81000 | 10 | 91 | 2.7 |
| Comp. Ex. 4 | HIPS | 10 | reinforced with short fiber | 350 | 520 | 29500 | 7 | 86 | 0.2 |
| Comp. Ex. 5 | HIPS | 30 | reinforced with short fiber | 610 | 820 | 63000 | 5 | 88 | 0.2 |
| Comp. Ex. 6 | HIPS | 0 | not reinforced | 280 | 460 | 21000 | 9 | 80 | — |

TABLE 3

| | Compsn. | | | Tensile strength (kgf/cm²) | Flexural strength (kgf/cm²) | Flexural modulus (kgf/cm²) | Impact strength (kg · cm/cm) | Heat distortion temp. (°C.) | Av. fiber length (mm) |
|---|---|---|---|---|---|---|---|---|---|
| | resin | glass cont. (wt. %) | | | | | | | |
| Comp. Ex. 7 | PS | 10 | reinforced with long fiber | 410 | 600 | 52000 | 3 | 89 | 2.7 |
| Comp. Ex. 8 | PS | 30 | reinforced with long fiber | 720 | 750 | 89300 | 8 | 92 | 2.7 |
| Comp. Ex. 9 | PS | 10 | reinforced with long fiber | 350 | 520 | 29500 | 7 | 92 | 0.2 |
| Comp. Ex. 10 | PS | 30 | reinforced with short fiber | 610 | 820 | 63000 | 5 | 96 | 0.2 |
| Comp. Ex. 11 | PS | 0 | not reinforced | 340 | 500 | 28000 | 1.5 | 74 | — |

As apparent from the above results, no striking improvement in impact strength can be recognized in the mere reinforcement of polystyrene with long fibers. In contrast, a striking improvement in impact strength is realized by the synergism of the contained rubber component and the long reinforcing fibers in the reinforcement of high-impact polystyrene with long fibers as demonstrated in the Examples.

The inventor's separate experiments have confirmed that the reinforcement of HIPS with long fibers exerts a unique effect as compared with the reinforcement of ABS resin known as a rubber-reinforced styrene resin with long fibers.

That is, the Izod impact strength of the ABS resin generally ranges from 20 to 40 kgf.cm/cm. The reinforcement thereof with short glass fibers causes the impact strength to lower to about 10 to 12 kgf.cm/cm. On the other hand, even if the resin is reinforced with long fibers, the impact strength thereof is not greater than about 15 to 20 kgf.cm/cm. In contrast, the reinforcement of the HIPS resin with long fibers strikingly improves the impact strength as demonstrated in the above Examples. It is presumed that the reason would be that, while the reinforcing fibers generally used in the long-fiber-reinforced resin have a diameter of several micrometers (for example, that of glass fiber is about 9 to 18 μm) and the rubber particle diameter of the ABS resin ranges from 0.1 to 0.5 μm with the result that the ABS resin is regarded as a substantially homogeneous matrix material and has little synergistic effect on the material rupture, the rubber component of the HIPS resin has an average particle diameter of 0.5 to 100 μm and frequently 1 to 50 μm with the result that, in this level of rubber particle diameter, the rubber component at the fiber/resin interface is contributory and exerts a reinforcing effect against rupture. In other words, it is believed that generally, the impact resistance of the fiber-reinforced resin is improved by the absorption of impact energy attributed to the rupture of the fiber/resin interface and subsequent fiber pulling. Thus, in a brittle material in which the elongation of the matrix resin is small as compared with that of the reinforcing fiber, the rupture of the fiber/resin interface and the fiber breaking would simultaneously occur at the time of rupture, so that no satisfactory absorption of impact energy would be attained. In contrast, in the long-fiber-reinforced HIPS resin, the particle diameter of the rubber component is suitably large and also the reinforcing fibers have a large fiber length, so that the proportion of the rubber component in contact with the surface of the reinforcing fiber would be so large as to render the fiber rupture unlikely to occur at the contact part, causing the fibers left after rupture to hold a relatively large length and to increase the absorption of impact energy by fiber pulling at the time of rupture with the result that a striking reinforcing effect is realized.

As apparent from the above, the long-fiber-reinforced HIPS resin of the present invention exerts an effect which cannot be anticipated at all by the results of reinforcement with short or long fibers of a resin containing no rubber component or a resin containing a rubber component whose particle diameter is however small, such as ABS resin, and hence has strikingly improved strength, rigidity and impact strength.

What we claim is:

1. A long-fiber-reinforced high-impact polystyrene resin structure of at least 3 mm in length, which is formed by compounding:

(A) a high-impact polystyrene resin with
   (B) 5 to 80 wt. % (based on the whole composition) of a fibrous reinforcement, and wherein said fibrous reinforcement (B) is substantially the same in length as the structure and is arrayed substantially in parallel in the lengthwise direction of the structure.

2. A long-fiber-reinforced high-impact polystyrene resin structure as claimed in claim 1, wherein the rubber component constituting the disperse phase of said high-impact polystyrene resin (A) is one having a number-average particle diameter of 1 to 50 μm.

3. A long-fiber-reinforced high-impact polystyrene resin structure as claimed in claim 1 or 2, wherein said high-impact polystyrene resin (A) is one containing 1 to 50 vol. % of the rubber component constituting the disperse phase thereof.

4. A long-fiber-reinforced high-impact polystyrene resin structure as claimed in claim 1 or 2, wherein said high-impact polystyrene resin (A) is one containing 5 to 30 vol. % of the rubber component constituting the disperse phase thereof.

5. A long-fiber-reinforced high-impact polystyrene resin structure as claimed in any one of claims 1 or 2, which is in the form of a pellet of 3 to 100 mm in length.

6. A molding which is produced by molding a long-fiber-reinforced high-impact polystyrene resin structure as claimed in any one of claims 1 or 2, and wherein said fibrous reinforcement (B) is dispersed with the weight-average fiber length thereof being at least 1 mm.

* * * * *